United States Patent [19]

Yabuki et al.

[11] Patent Number: 5,752,868
[45] Date of Patent: May 19, 1998

[54] APPARATUS FOR AND METHOD OF COLLECTING USED CATHODE-RAY TUBES

[75] Inventors: Fujio Yabuki, Saitama; Yukio Abe, Kanagawa; Hajime Koike, Tokyo; Koji Kanehira, Chiba, all of Japan

[73] Assignee: Sony Corporation, Japan

[21] Appl. No.: 604,570

[22] Filed: Feb. 21, 1996

[30] Foreign Application Priority Data

Feb. 23, 1995 [JP] Japan .................................. 7-058250

[51] Int. Cl.[6] .................................................. H01J 9/50
[52] U.S. Cl. ......................................... 445/2; 445/61
[58] Field of Search ................................. 445/2, 61

[56] References Cited

U.S. PATENT DOCUMENTS

| 5,352,142 | 10/1994 | Wolf | 445/2 |
| 5,454,519 | 10/1995 | Lück | 241/24 |
| 5,556,018 | 9/1996 | Kanehira | 445/2 |

FOREIGN PATENT DOCUMENTS

| 542676 | 5/1993 | European Pat. Off. | 445/2 |
| 41 00 346 | 7/1992 | Germany . | |
| 43 16 512 | 9/1994 | Germany . | |
| 4314013 | 11/1994 | Germany | 445/2 |
| 4319364 | 12/1994 | Germany | 445/2 |
| 94/05428 | 3/1994 | WIPO . | |

OTHER PUBLICATIONS

Patent Abstracts of Japan, vol. 5, No. 194 (C–082), Dec. 10, 1981: Abstract of JP-A-56 115682 (Teisan KK et al.), Sep. 10, 1981.

Aufbereitungs Technik, vol. 34, Aug. 1993, Weisbaden DE, pp. 399–406, XP000392222: P. Koch, "Concepts for Dismantling and Processing of Electronic Scrap".

*Primary Examiner*—P. Austin Bradley
*Assistant Examiner*—Jeffrey T. Knapp
*Attorney, Agent, or Firm*—Ronald P. Kananen

[57] ABSTRACT

An apparatus for collecting a cathode-ray tube (2) from a waste cathode-ray tube device (1) and recycling the cathode-ray tube (2) includes a conveyor (15) having a moving pallet (21) for detachably holding a panel portion (10) of the cathode-ray tube (2) by vacuum adsorption portions (63a) through (63d) and sequentially conveying the panel portion (10) to a predetermined position, a device for leaving only the cathode-ray tube (2) by scrapping the waste cathode-ray tube device (1) held on the moving pallet (21) and separating and removing a device housing (4) from the waste cathode-ray tube device (1), and a conveyor for conveying the separated device housing (4). According to an apparatus for and method of collecting a used cathode-ray tube, a cathode-ray tube can be collected from a waste cathode-ray tube device easily and inexpensively, and natural resources can be recycled.

13 Claims, 6 Drawing Sheets

APPARATUS FOR AND METHOD OF COLLECTING USED CATHODE-RAY TUBES

BACKGROUND OF THE INVENTION

The present invention relates to a apparatus for and method of collecting used cathode-ray tubes (CRTs), and more particularly to a apparatus for and a method of collecting used CRTs in which CRTs housed in waste CRT devices are easily inexpensively scrapped by a simple apparatus, and hence natural resources can be recycled.

Recently, recycling of natural resources and environmental disruption have received a remarkable attention again, and researches for recycling used products have been made in a variety of industrial fields. CRT devices are one of such used products to be recycled.

Figure 1:
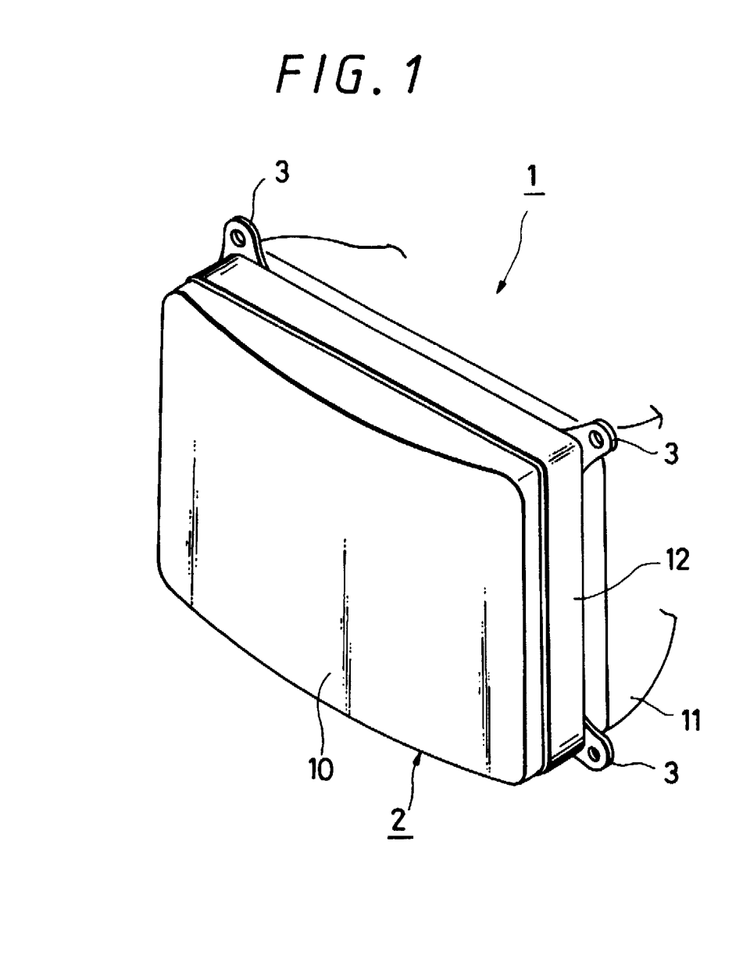
FIG. 1 is a perspective view of a cathode-ray tube (CRT)
Figure 2:
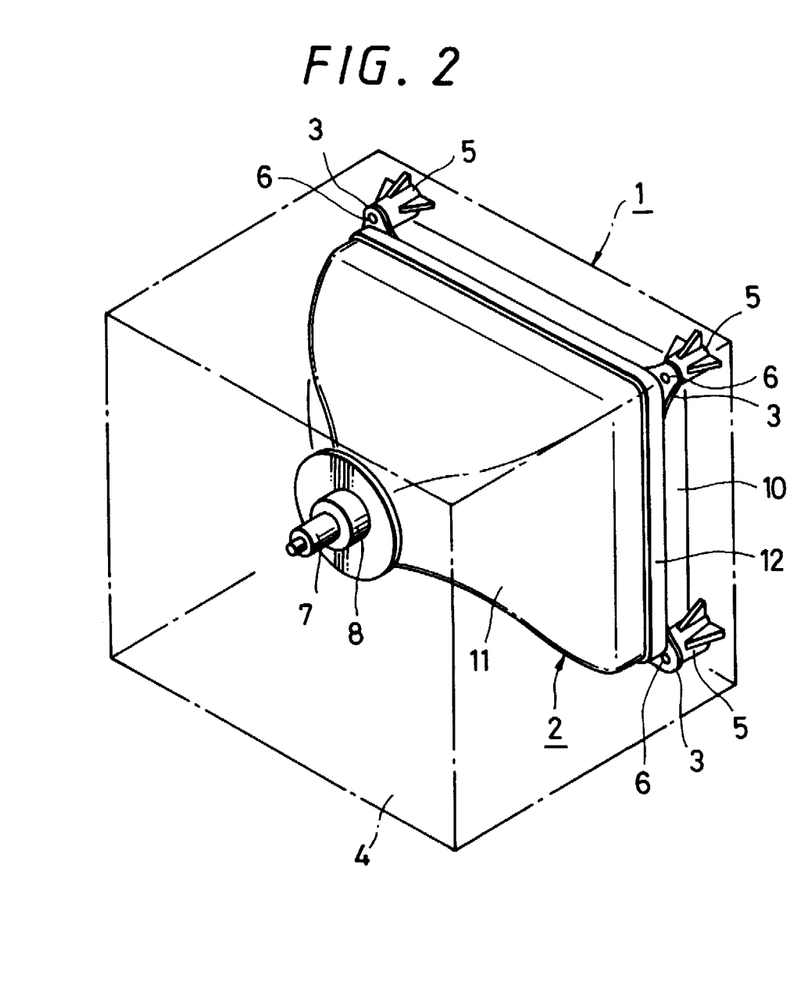
FIG. 2 is a perspective view illustrating a manner that the CRT is housed in a CRT device.

FIG. 1 of the accompanying drawings is a perspective view illustrative of a CRT unit, and FIG. 2 is a perspective view illustrating a manner in which the CRT unit is housed in a CRT device.

In a CRT device, generally denoted at reference numeral 1 in FIGS. 1 and 2, a CRT 2 is attached to the CRT device 1 by engaging brackets 3 attached to the CRT 2 to attachment bosses 5 of a device housing (cabinet) 4 with attachment screws 6.

The CRT 2 has an electron gun portion 7 and a deflection yoke portion 8 attached to its back side as it is seen from the outside. The CRT 2 itself comprises a panel portion 10 and a funnel portion 11 which are fastened together by welding of a frit glass (solder glass). An anti-explosion band 12 is attached to the front surface of the panel portion 10. Most part of the CRT 2 itself is made of glass, and considered as a product suitable for being recycled relatively easily. Therefore, various researches for the CRT 2 and the CRT device 1 are now being made in order to efficiently recycle the glass of the CRT 2 used in the CRT device 1.

However, CRT devices 1 of various shapes and types are now commercially available on the market, which becomes a bottleneck in collecting the CRT 2 from the CRT device 1. It is therefore requested that the CRTs 2 can automatically stably be disjoined from the CRT devices 1 of various shapes and types on the same scrap work line highly-efficiently.

In the CRT 2, a constituent of glass in the panel portion 10 has to be limited more strictly than that of glass in the funnel portion 11 because an image is displayed on the panel portion 10. The glass of the funnel portion 11, for example, generally contains a lead in order to improve X-ray absorption property thereof. However, the amount of a lead contained in the glass of the panel portion 10 is strictly limited because if the glass of the panel portion 10 were containing a lead in excess of a predetermined amount, a browning would occur. Therefore, when collected CRTs (waste CRTs) are recycled, the waste CRT has to be separated into the panel portion 10 and the funnel portion 11 and then recycled.

SUMMARY OF THE INVENTION

In view of the aforesaid aspect, it is an object of the present invention to provide an apparatus for and method of collecting a used cathode-ray tube from a waste cathode-ray tube device wherein a cathode-ray tube can be collected from a waste cathode-ray tube device by a simple apparatus easily inexpensively and thereby natural resources can be recycled.

According to an aspect of the present invention, there is provided an apparatus for collecting a waste cathode-ray tube which is comprised of a conveyor having a moving pallet for detachably holding a panel portion of the cathode-ray tube and sequentially moving the moving pallet to a predetermined position, a means for scrapping the cathode-ray tube device held on the moving pallet to separate a device housing from the cathode-ray tube device while leaving only the cathode-ray tube, and a conveying means for conveying the separated device housing.

In the above apparatus for collecting a used cathode-ray tube, preferably, the separated cathode-ray tube is separated into a panel portion and a funnel portion, and they are conveyed to different positions, at which they are recycled, respectively.

According to another aspect of the present invention, there is provided a method of collecting a used cathode-ray tube which is comprised of the steps of detachably placing a panel portion of a cathode-ray tube on a moving pallet guided and moved by a conveyor to a predetermined position and attaching the cathode-ray tube device to the moving pallet, leaving only the cathode-ray tube by scrapping and removing the cathode-ray tube device under the condition that the cathode-ray tube is attached to the moving pallet, and collecting the cathode-ray tube.

In the above collecting method, preferably, the separated cathode-ray tube obtained when the cathode-ray tube device is scrapped and removed is separated into a panel portion and a funnel portion, and they are conveyed to different positions, at which they are recycled, respectively.

According to a further aspect of the present invention, there is provided an apparatus for collecting a used cathode-ray tube which is comprised of a conveyor having a moving pallet with a holding portion for detachably holding a panel portion of the cathode-ray tube and sequentially moving the moving pallet to a predetermined position, and a means for moving the holding portion to a position matched to a size of the cathode-ray tube.

According to such an arrangement, the waste cathode-ray tube device is sequentially moved by the moving pallet, and guided by the conveyor, to a predetermined position in such a state that a front face of the cathode-ray tube is maintained. At the position in which the waste cathode-ray tube device is conveyed, the waste cathode-ray tube device can be scrapped under the condition that it is resting on the moving pallet.

DETAILED DESCRIPTION OF THE PREFERRED EMBODIMENT

Apparatus for and method of collecting used CRTs according to the present invention will be described in detail below with reference to the drawings.

Figure 3:
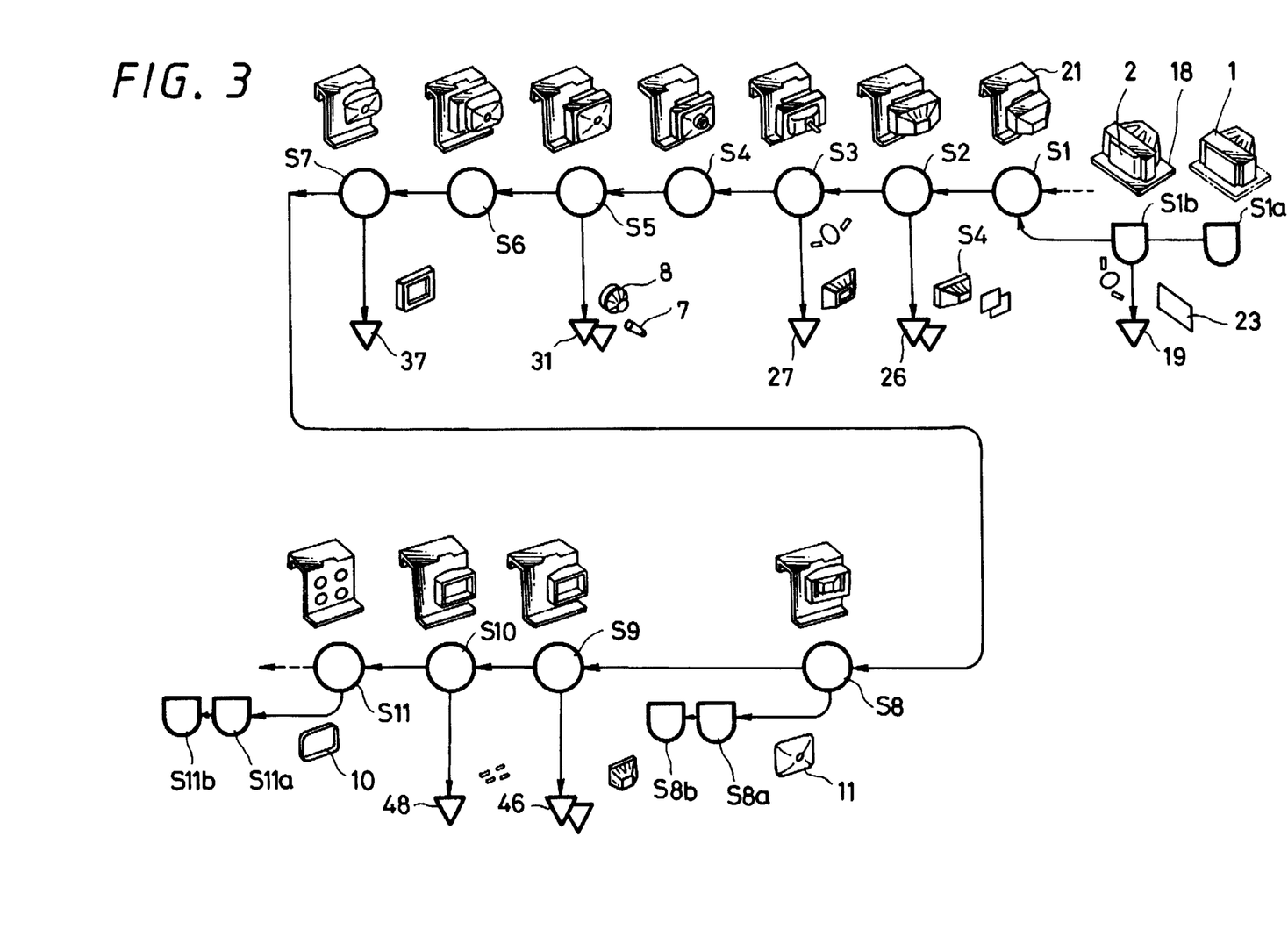
FIG. 3 is a process chart showing processes for collecting used CRTs according to the present invention.
Figure 4:
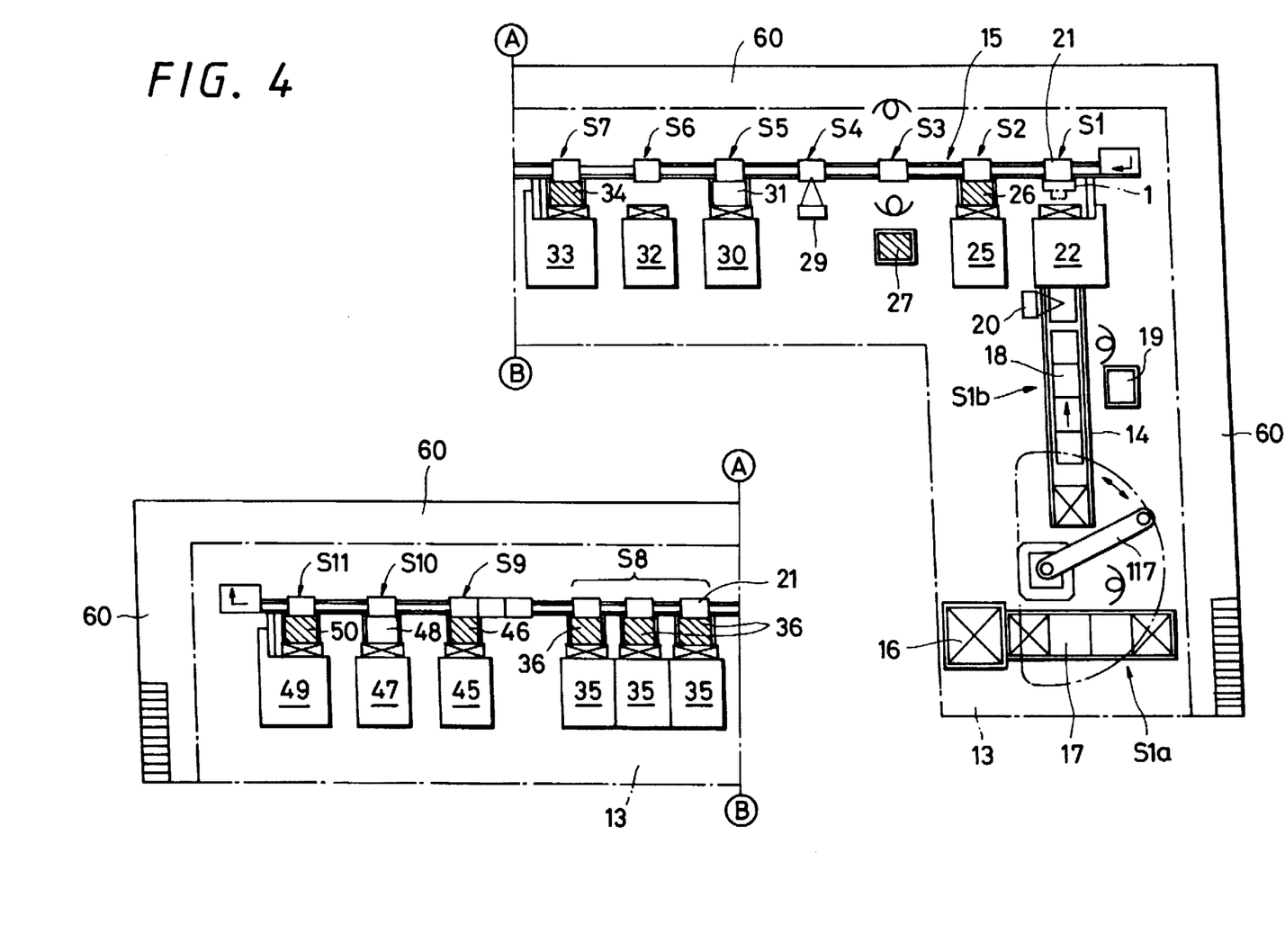
FIG. 4 is a plan view illustrating the layout of the upper stage of a collecting apparatus.
Figure 5:
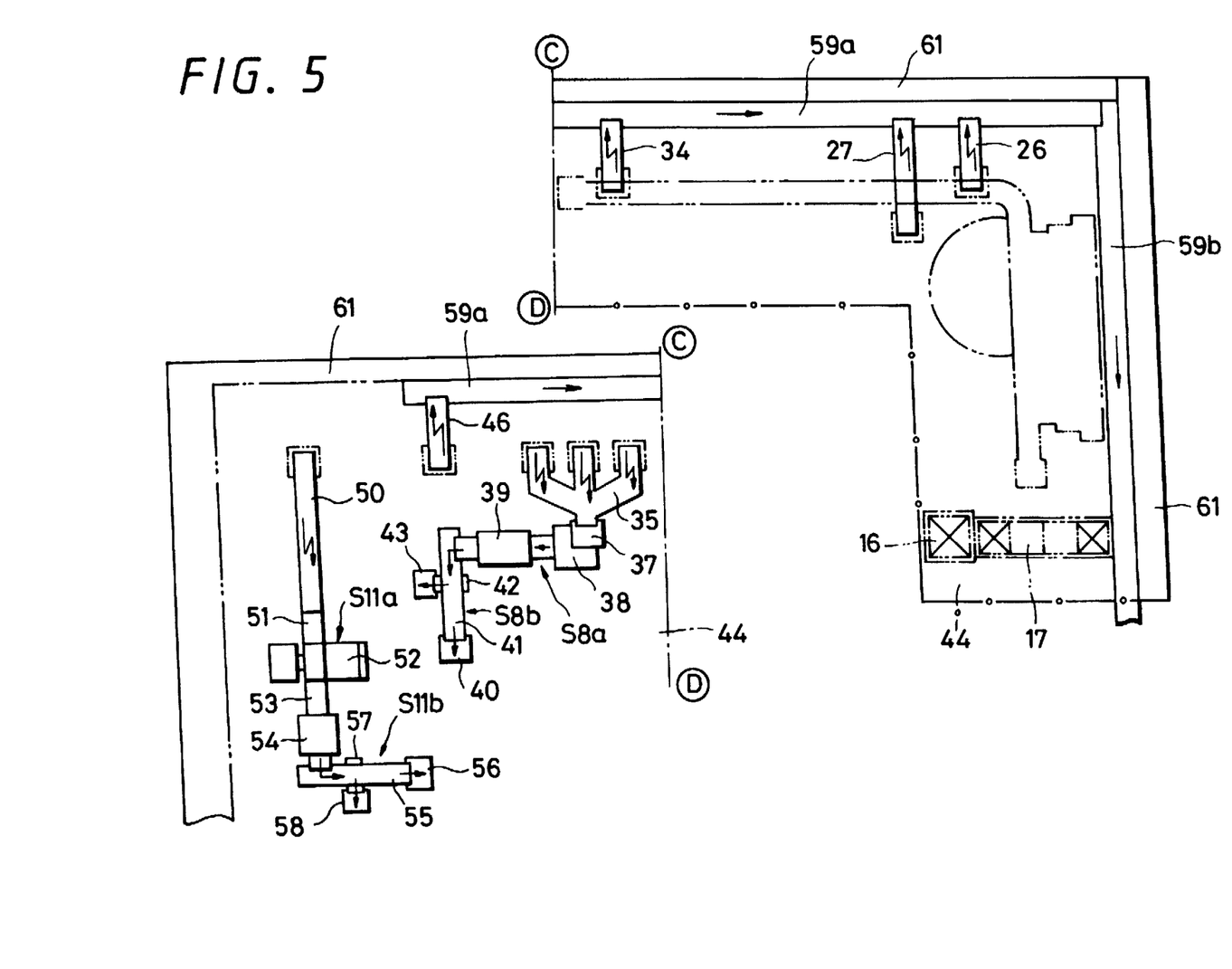
FIG. 5 is a plan view illustrating the layout of the lower stage of the collecting apparatus.

FIG. 3 is a chart showing CRT collection processes according to the present invention. FIGS. 4 and 5 are plan views illustrating the layouts of the collecting apparatus according to the present invention. More specifically, FIG. 4 shows the layout of the upper stage of the collecting apparatus, and FIG. 5 shows the layout of the lower stage of the collecting apparatus. In the collecting apparatus according to the present invention, its component, which directly contributes to the process of disjoining the CRT from the CRT device, is disposed on the floor of the upper stage, and its component, which processes waste materials that had been disjoined on the upper stage, is disposed on the floor of the lower stage.

As shown in FIG. 3, roughly classified, the collecting apparatus according to the present invention comprises a preliminary process S1a, a preliminary process S1b, a collection process S1, a collection process S2, a collection process S3, a collection process S4, a collection process S5, a collection process S6, a collection process S7, a collection process S8, a recycle-treatment process S8a, a recycle-treatment process S8b, a collection process S9, a collection process S10, a collection process S11, a recycle-treatment process S11a, and a recycle-treatment process S11b.

Specifically, as shown in FIG. 4, the upper stage of this collecting apparatus has a floor 13 on which there are disposed a conveyor 14 for conveying a waste CRT device 1 from the preliminary process S1a through the preliminary process S1b to the collection process S1, a vertical free-flow conveyor 15 for conveying the waste CRT device 1 until the CRT 2 is finally collected after the waste CRT device 1 has been scrapped, i.e., conveying the CRT 2 from the collection process S1 to the collection process S11, and the following devices in association with the above-mentioned respective processes.

The preliminary process S1a includes an elevator 16 for conveying a used CRT device 1 (hereinafter simply referred to as a "waste CRT device 1") from a floor 44 of the lower stage, a waste CRT device table 17 for temporarily stocking the waste CRT device 1 transported thereto by the elevator 16 and a balancer arm 117 for shifting the waste CRT device 1 from the waste CRT device table 17 onto the conveyor 14. The waste CRT device table 17 is in the form of conveyor, and the elevator 16 is able to transfer the waste CRT device 1, transported from the lower stage, to the waste CRT device table 17 on the upper stage. Further, the waste CRT device table 17 is so designed as to move and place the waste CRT device 1, which was transferred thereto from the elevator 16, at a position at which the balancer arm 117 can easily hold the waste CRT device 1.

The preliminary process S1b has the conveyor 14 disposed between the preliminary process S1a and the collection process S1, and a pallet 18 is resting on the conveyor 14. The pallet 18 receives the waste CRT device 1 conveyed thereto by the balancer arm 117 from the preliminary process S1a, and is moved together with the conveyor 14 for transporting the waste CRT device 1 to the collection process S1. A box 19 is disposed on the right-hand side of the conveyor 14 for storing therein a front glass 23 (see FIG. 3) that has been removed by the operator from the front surface of the waste CRT device 1 if the CRT 2 is covered with the front glass 23. A set-size checker 20 is disposed on the side opposite to the side where the box 19 is disposed, i.e., on the left-hand side of the conveyor 14, for detecting a size of an external shape of the waste CRT device 1, or the like. The set-size checker 20 is comprised of a television camera or the like for determining a size of an external shape of the waste CRT device 1 or the like by electrically processing an image obtained from the television camera.

The collection process S1 includes a pallet-setter 22 for transferring the waste CRT device 1 resting on the pallet 18 conveyed by the conveyor 14 onto a moving pallet 21 resting on the conveyor 15. A vacuum adsorption mechanism, which will be described later on, is disposed on the moving pallet 21 on the side on which the waste CRT device 1 is set by the pallet-setter 22. The vacuum adsorption mechanism holds the front face (panel portion 10) of the CRT 2 by vacuum adsorption, and the waste CRT device 1 on the moving pallet 21 is conveyed by the conveyor 15 to the next process.

The collection process S2 includes a cabinet cutter (rear-cover separating machine) 25 for removing the cabinet, the rear cover and the base, or the like by cutting the cabinet 24 (see FIG. 3) of the waste CRT device 1. The collection process S2 includes also a dust-chute 26 which holds and collects waste materials such as the removed cabinet 24, the removed rear cover, the removed base, or the like. The dust-chute 26 is communicated with the lower stage, and the removed cabinet 24, etc., are transported to the lower stage through the dust-chute 26.

The collection process S3 includes a dust-chute 27, and the dust-chute 27 is communicated with the lower state similarly to the dust-chute 26. In the collection process S3, an outer-shield case, a panel, etc., are removed from the waste CRT device 1 by the operator, and the CRT 2 has minimum peripheral assemblies, such as the electron gun portion 7, the deflection yoke portion 8 or the anti-explosion band 12 attached thereto. The outer-shield case, the panel, etc., removed from the waste CRT device 1 are transported to the lower stage through the dust-chute 27.

The collection process S4 includes a CRT-size checker 29 for measuring the size of the CRT 2 conveyed thereto through the collection process S3. The CRT-size checker 29 is comprised of a television camera or the like, and determines the size of the CRT 2 by electrically processing an image of the CRT 2 obtained from the television camera.

The collection process S5 includes a deflection yoke removing machine (including a vacuum breaker) 30 which removes the electron gun portion 7 and the deflection yoke portion 8 from the CRT 2, and also includes a box 31 which holds and stores therein the waste electron gun portion 7 and deflection yoke portion 8 removed by the deflection yoke removing machine 30.

The collection process S6 includes an anti-explosion band preliminary removing machine 32 which removes the anti-explosion band 12 from the front face of the panel portion 10. The anti-explosion band preliminary removing machine 32 heats and expands the whole of the anti-explosion band 12 by flowing current to the brackets 3 disposed on the diagonals of the CRT 2, for example, so that the anti-explosion band 12 can be easily dismantled from the panel portion 10.

The collection process S7 includes a front cabinet removing machine 33 for removing the anti-explosion band 12 heated and expanded in the collection process S6 and the front cabinet from the panel portion 10. The collection process S7 includes also a dust-chute 34 for conveying waste materials such as the removed anti-explosion band 12 and front cabinet. The dust-chute 34 is communicated with the lower stage similarly to the dust-chutes 26, 27, and conveys the waste anti-explosion band 12 and front cabinet to the lower stage.

The collection process S8 includes three panel/funnel separating machines 35 each separating the panel portion 10 and the funnel portion 10 from the CRT 2. The separated panel portion 10 is resting on the moving pallet 21, and only the funnel portion 11 is removed from the CRT 2. The reason that the collection process S8 includes the three panel/funnel separating machines 35 is as follows. Because the collection process S8 needs a lot of time as compared with other processes, the three panel/funnel separating machines 35 can separate a large number of panel portions 10 and funnel portions 11 of the CRTs 2 one at a time. Each panel/funnel separating machine 35 includes a chute 36 for conveying therethrough the removed funnel portion 11 to the lower stage, and each chute 36 is communicated into a stocker 37 disposed on the lower stage. The recycle-treatment processes S8a, S8b disposed on the floor 44 of the lower stage effect predetermined treatments on the funnel portions 11 conveyed into the stocker 37.

The recycle-treatment process S8a includes a funnel glass washing machine 38 and a finish washing machine 39 according to a shaking method. The funnel portions 11 are washed by the funnel glass washing machine 38 and the finish washing machine 39, in that order.

The recycle-treatment process S8b is disposed at the rear portion of the recycle-treatment process S8a, and includes a belt conveyor 41 for conveying the funnel portions 11, washed by the finish washing machine 39, to a funnel glass cullet storage box 40, a magnetic separator 42 disposed at nearly the intermediate position of the belt conveyor 41 for magnetically selecting the funnel portions 11 and excluding foreign assemblies from the funnel portions, and a magnetic-separator storage box 43 for storing the foreign assemblies selected and extracted by the magnetic separator 42. The funnel portions 11 that have been stored in the funnel glass cullet storage box 40 are crushed by a crusher (not shown) with a pressure into recyclable glass cullets, and conveyed to other process (not shown), whereafter they are fused for recycling. The foreign assemblies that have been stored in the magnetic-separator storage box 43 are treated by a suitable means (not shown).

The collection process S9 includes an inner-shield aperture grill removing machine 45 for removing a shield plate or an aperture panel spring if the shield plate or the aperture panel is disposed on the inside of the panel portion 10 with the funnel portion 11 removed therefrom. The collection process S9 includes a dust-chute 46 for conveying therethrough waste materials such as the removed shield plate and aperture grill spring. The dust-chute 46 also is extended to the lower stage similarly to the dust-chutes 26, 27, and 34. The waste shield plate and aperture grill spring in the dust-chute 46 are conveyed to the lower stage.

The collection process S10 includes an aperture grill pin removing machine 47 for removing aperture grill pins from the aperture grill. The collection process S10 includes a waste material storage box 48 for storing the aperture grill pins that have been removed by the aperture grill pin removing machine 47.

The collection process S11 includes a panel moving and removing machine 49, and a dust-chute 50 for conveying therethrough the panel portion 10, held and moved from the moving pallet 21 by the panel moving and removing machine 49, to the lower stage. The panel portions 10 can be transported through the dust-chute 50 to the recycle-treatment processes S11a, S11b disposed on the lower stage.

The recycle-treatment processes S11a, S11b on the lower stage will be described below.

On the floor 44 of the lower stage are disposed a pallet 51 for holding the panel portions 10 sequentially chuted from the dust-chute 50, a panel glass washing machine 52 using a blast method, a pallet 53, a panel glass crusher 54, a belt conveyor 55, a panel glass cullet storage box 56, a magnetic separator 57 and a magnetic separator storage box 58 disposed at somewhere of the belt conveyor 55, etc. The panel portion 10 that has been chuted through the dust-chute 50 is conveyed by the pallet 51 to the panel glass washing machine 52, whereafter dusts or smudges are removed from the panel portion 10 by the panel glass washing machine 52. Then, the washed panel portion 10 is conveyed by the pallet 53 to the panel glass crusher 54, whereby it is crushed with a pressure into recyclable glass cullets. The glass cullets are conveyed by the belt conveyor 55 to the panel glass cullet storage box 56, and further transported to other process (not shown), in which they are fused for recycling. Undesirable materials are removed from the glass cullets by the magnetic separator 57 on their own way to the panel glass cullet storage box 56, and treated by a suitable means (not shown).

On the floor 44 of the lower stage are disposed belt conveyors 59a, 59b for conveying to waste-treatment facilities (not shown) the waste materials chuted thereto from the upper stage through the dust-chutes 26, 27, 34. A region 60 on the floor 13 of the upper stage shown in FIG. 4 and a region 61 on the floor 44 of the lower stage shown in FIG. 5 are passages through which operators and trucks are allowed to pass.

Figure 6:
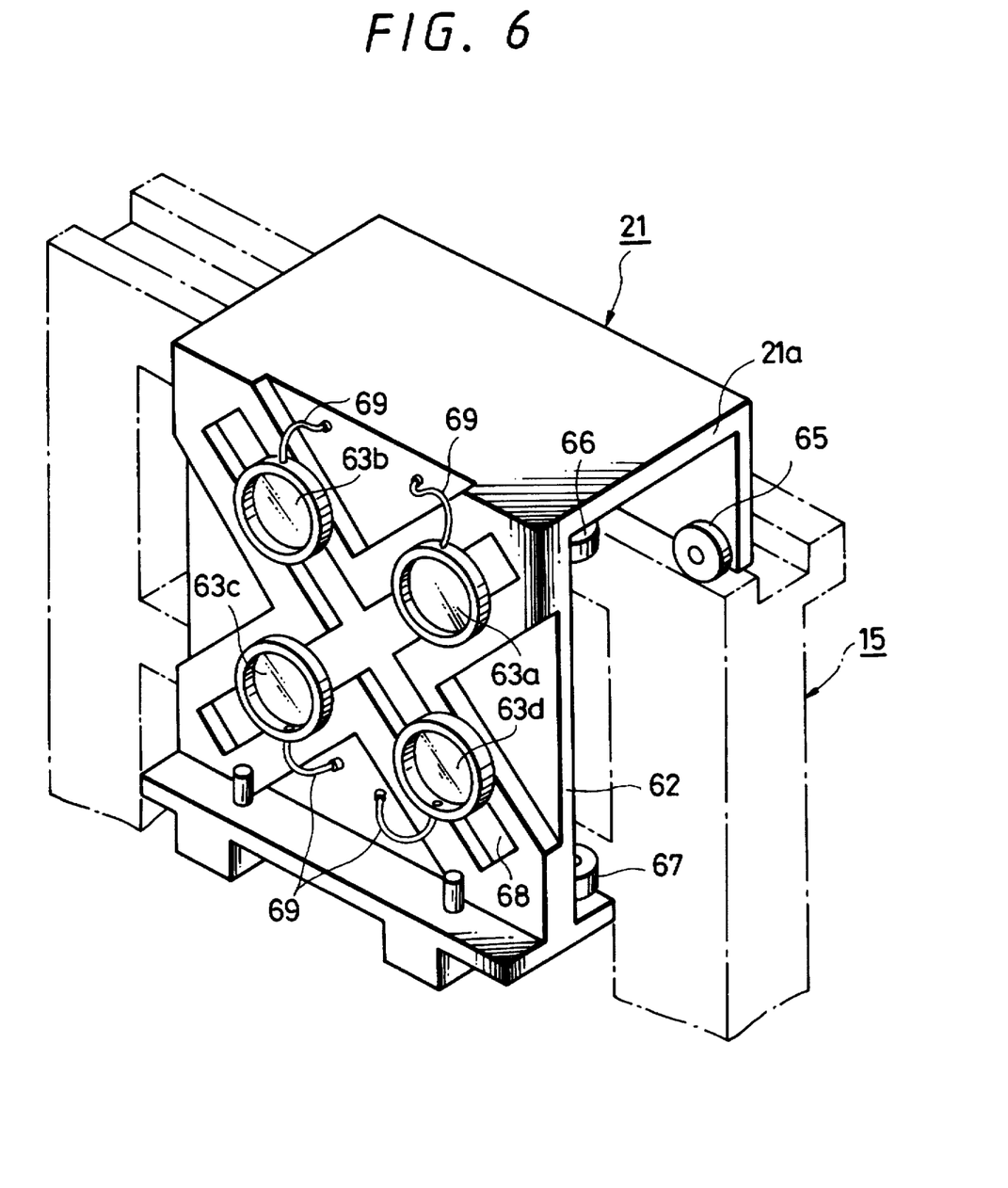
FIG. 6 is a perspective view illustrating a main portion of a moving pallet in the collecting apparatus according to the present invention.

FIG. 6 is a perspective view schematically illustrating the moving pallet 21 attached to the vertical free-flow conveyor 15. As shown in FIG. 6, the moving pallet 21 comprises a pallet housing 62, four vacuum adsorption portions 63a, 63b, 63c, 63d, and a vacuum adsorption unit movement mechanism 64 (see FIG. 7) for moving these vacuum adsorption portions 63a through 63d in the directions shown by arrows C and D in FIG. 7.

More specifically, the pallet housing 62 has an upper end portion 21a which is in the form of substantially U-letter in cross section. Guide rollers 65, 66 are attached to the upper end portion 21a, and a guide roller 67 also is attached to a lower end portion of the pallet housing 62. These guide rollers 65, 66, 67 are brought in contact with the conveyor 15, and the moving pallet 21 is moved by a suitable means (not shown) toward the collection processes S1 through S11. When the moving pallet 21 reaches the collection process S11, the pallet 21 is moved under the conveyor 15, and returned to the collection process S1. Thereafter, the moving pallet 21 is moved again from the collection process S1 to the collection process S11. A substantially X-like opening 68 is defined on the pallet housing 62 in confronting relation to the plane with the CRT 2 attached thereto. This opening 28 serves as a guide for the vacuum adsorption portions 63a through 63d so that these vacuum adsorption portions 63a through 63d can be moved radially. The vacuum adsorption portions 63a through 63b are connected through hoses 69 to a vacuum pump (not shown). Therefore, when the vacuum pump is energized under the condition that the vacuum adsorption portions 63a through 63d are closely contacted with the panel portion 10 of the CRT 2, the vacuum adsorption portions 63a through 63d are energized to adsorb the CRT 2, whereby the CRT 2 can be held on the pallet housing 62.

The vacuum adsorption unit movement mechanism 64 will be described in detail with reference to FIG. 7.

Figure 7:
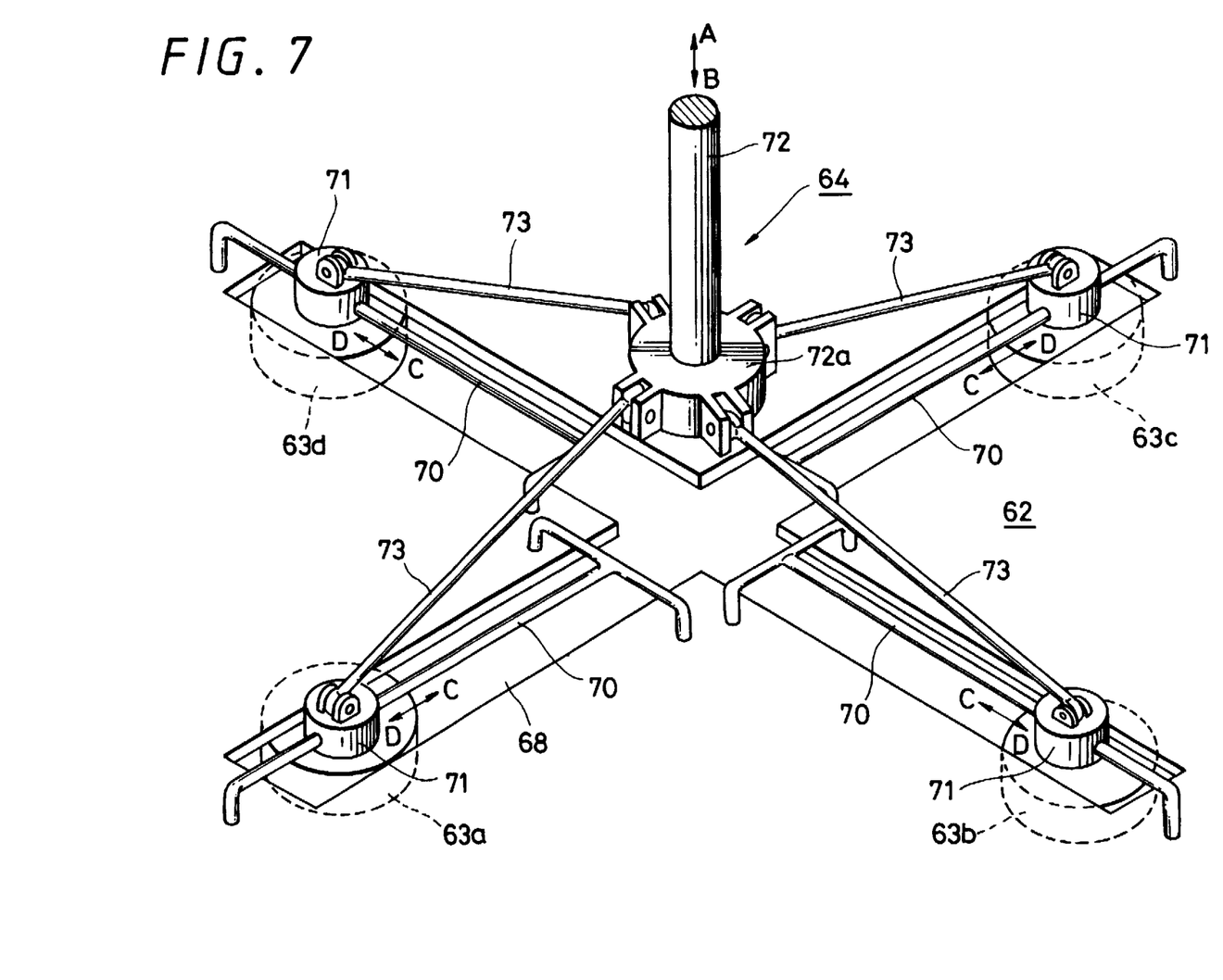
FIG. 7 is a perspective view illustrating a main portion of the collecting apparatus according to the present invention, i.e., a pallet housing and a vacuum adsorption unit movement mechanism.

As shown in FIG. 7, the vacuum adsorption unit movement mechanism 64 is disposed on the reverse side of the pallet housing 62, and comprises four guide members 70 extending substantially from the center of the four openings 68, sliders 71 sliding over the guide members 70 in unison with the vacuum adsorption portions 63a through 63d, a rod 72 movable back and forth (upper and lower direction in FIG. 7) in opposing relation to an intersection of the openings 68, and four link-bars 73 each with one end linked to the slider 71 and another end linked to an end 72a of the rod 72. The rod 72 is moved by a hydraulic cylinder (not shown) in the directions shown by arrows A and B in FIG. 7. When the rod 72 is moved in the arrow A direction, each slider 71 is moved in the direction shown by the arrow C in FIG. 7. When the rod 72 is moved in the arrow B direction, each slider is moved in the direction shown by the arrow D in FIG. 7. Therefore, when the rod 72 is moved in the arrow A direction and each slider 71 is moved in the arrow C direction, the vacuum adsorption portions 63a through 63d are inwardly contracted, and become suitable for holding the CRT 2 of small size by vacuum adsorption. Conversely, when the rod 72 is moved in the arrow B direction and each slider 71 is moved in the arrow D direction, the vacuum adsorption portions 63a to 63d are outwardly extended, and become suitable for holding the CRT 2 of large size by vacuum adsorption. The hydraulic cylinder that moves the rod 72 in the directions shown by the arrows A and B in FIG. 7 is driven in response to a command signal generated from a control unit (not shown) mainly comprising a microprocessor. The control unit controls the hydraulic cylinder in response to data indicative of values of CRT sizes detected by the set-size checker 20 and the CRT-size checker 29. The control unit controls the whole of the collecting apparatus as well as the hydraulic cylinder, and a control procedure thereof is previously programmed and stored in a memory of the above microprocessor.

An operation of used CRT collecting apparatus thus arranged so far will be described below.

Initially, the waste CRT device 1 is conveyed to the position of the elevator 16 of the lower stage. Then, the waste CRT device 1 is conveyed by this elevator 16 to the upper stage, and rests on the waste CRT table 17 composed of the conveyor in the preliminary process S1a. The operator visually confirms whether or not the waste CRT device 1 is resting on the waste CRT table 17 in the correct direction with the correct orientation. If it is visually determined by the operator that the waste CRT device 1 is not resting on the waste CRT table 17 in the correct direction with the correct orientation, then the operator places the waste CRT device 1 on the waste CRT table 17 at its correction position with the correct orientation.

Then, the balancer arm 117 is actuated to transport the waste CRT device 1 on the waste CRT table 17 to the conveyor 14, thereby the waste CRT device 1 being placed on the pallet 18. The waste CRT device 1 resting on the pallet 18 is conveyed toward the collection process S1. On its own way to the collection process S1, the type of the waste CRT device is visually checked by the operator during the preliminary process S1, i.e., whether or not the waste CRT device 1 is of the type that the front glass 23 is attached to the front face of the waste CRT device 1. If the waste CRT device 1 is of the type with the front glass 23 attached to its front face, then the front glass 23 is removed from the front face of the waste CRT device 1, and the removed waste front glass 23 is stored into the box 19 as a waste material. The waste front glass 23 that has been put into the box 19 is conveyed to other position while still resting in the box 19, and washed thereby. Then, the washed front glass 23 is crushed with a pressure by use of a crusher (not shown) into recyclable glass cullets for recycling.

The waste CRT device 1 with the front glass 23 removed therefrom and the waste CRT device 1 with no front glass 23 attached thereto in the beginning are supplied to the set-size checker 20, in which the size of the external shape of the waste CRT device 1 is detected. A detected result is inputted to the above control unit as information. Then, it is determined whether or not the waste CRT device 1 can be treated by this collection apparatus. If it is determined that the waste CRT device 1 cannot be treated by this collection apparatus, then such a waste CRT device 1 is removed from the conveyor 14, and treated by a suitable means (not shown) according to other method. If on the other hand it is determined that the waste CRT device 1 can be treated by this collection apparatus, then the hydraulic cylinder is energized by the signal from the control unit to actuate the vacuum adsorption movement mechanism 64, thereby changing the positions of the vacuum adsorption portions 63a through 63d. The positions of the vacuum adsorption portions 63a through 63d are adjusted in consideration of the whole shape and the center of gravity of the waste CRT device 1, or the like.

If it is determined that the waste CRT device 1 can be treated by this collection apparatus, then the hydraulic cylinder in the vacuum adsorption unit movement mechanism 64 is energized to move the vacuum adsorption portions 63a through 63d to proper positions so that they can hold the waste CRT device 1 by vacuum adsorption. In the collection process S1, the waste CRT device 1 is held by the pallet-setter 22, and the panel portion 10 of the CRT 2 is urged against the vacuum adsorption portions 63a through 63d on the moving pallet 21. Then, the vacuum adsorption portions 63a through 63d are evacuated down to the negative pressure to hold the waste CRT device 1. The waste CRT device 1 will be sequentially moved to the respective processes by the moving pallet 21 moved by the conveyor 15.

When the waste CRT device 1 on the moving pallet 21 is conveyed to the collection process S2, a part of the cabinet and the rear cover covering the outside of the waste CRT device 1, the base and etc., are cut and removed by the cabinet cutter 25 from the rear side of the waste CRT device 1 during the collection process S2. Then, the removed cabinet, rear cover and base, etc., are chuted through the dust-chute 26 to the conveyor 58 of the lower stage, and treated as waste materials.

Subsequently, the CRT 2 resting on the moving pallet 21 is conveyed to the collection process S3. In this collection process S3, the shield case, the bolts and the outer-shield are removed from the CRT 2, and the removed assemblies are chuted through the dust-chute 28 to the conveyor 58 on the lower stage, thereby treated as waste materials. As a consequence, the CRT 2 is in the form of CRT having minimum peripheral assemblies such as the electron gun portion 7, the deflection yoke 8 and the anti-explosion band 12 attached thereto. Thereafter, the CRT 2 is conveyed to the collection process S4, and the size of the CRT 2 is checked by the CRT-size checker 29 during the collection process S4. Data indicative of a checked result of the size of the CRT 2 is supplied to the control unit (not shown).

Then, the CRT 2 is transported to the collection process S5, and the electron gun portion 7 and the deflection yoke 8 are removed by the deflection yoke removing machine (including the vacuum breaker) 30 from the CRT 2 during the collection process S5 while the vacuum state of the CRT 2 is being broken. The removed electron gun portion 7 and deflection yoke 8 are stored in the box 31, and left apart from other assemblies for their own treatment.

The CRT 2 is transported to the collection process S6. In the collection process S6, when a current is flowed to the anti-explosion band 12 attached to the front face of the panel portion 10 from the anti-explosion band preliminary removing machine 32, the whole of the anti-explosion band 12 is heated and expanded so as to become easy to be removed from the panel portion 10. Then, the CRT 2 is transported to the collection process S7, and the anti-explosion band 12 and the front cabinet are removed by the front cabinet removing machine 33 from the front face of the panel portion 10 during the collection process S7. The anti-explosion band 12 and the front cabinet, etc., thus far removed in the collection process S7 are chuted through the dust-chute 34 to the conveyor 58 on the lower stage, and treated as waste materials.

Then, the CRT 2 is transported to the collection process S8. In the collection process S8, the CRT 2 is separated by the panel/funnel separator 35 into the panel portion 10 and the funnel portion 11, and only the funnel portion 11 is removed from the CRT 2 under the condition that the panel portion 10 is resting on the moving pallet 21. The funnel portion 11 removed from the CRT 2 is chuted and disposed once within the stocker 37 provided on the lower stage through the chute 36, and sequentially treated in a predetermined manner by the recycle-treatment processes S8a, S8b installed on the floor 44 of the lower stage.

Specifically, in the recycle-treatment process S8a, the funnel portion 11 is successively washed by the funnel-glass washing machine 38 and the finish washing machine 39. In the recycle-treatment process S8b, the funnel portion 11 that has been washed by the finish washing machine 39 is transported to the funnel glass cullet storage box 40, wherein it is crushed by a crusher (not shown) with a pressure into recyclable glass cullets. Then, the recyclable glass cullets are sent to other process (not shown), wherein they are fused for recycling.

On the other hand, the panel portion 10 with the funnel portion 11 removed therefrom is transported to the collection process S9 under the condition that it is attached to the moving pallet 21. Then, if the shield plate or the aperture panel, etc., is disposed on the inside of the panel portion 10 with the funnel portion 11 removed therefrom, then the shield plate or aperture panel spring is removed by the shield aperture grill removing machine 45 from the inside of the panel portion 10. As a result, the panel portion 10 is comprised of nearly glass only. The removed shield plate or aperture grill spring is chuted through the dust chute 46 to the belt conveyor 58 on the lower stage, and treated as a waste material. Then, the panel portion 10 is transported to the collection process S10, in which aperture grill pins are removed by the aperture grill pin removing machine 47 from the panel portion 10. The pins thus so far removed are stored in the waste material storage box 48 as waste materials to be treated later on.

Then, the panel portion 10 is transported to the collection process S11. In the collection process S11, the vacuum adsorption portions 63a through 63d are evacuated down to the negative pressure to remove the adsorption, and the panel portion 10 is removed by the panel moving and removing machine 49 from the moving pallet 21. The removed panel portion 10 is transported through the dust chute 50 to the recycle-treatment processes S11a, S11b provided on the lower stage.

The panel portion 10 transported through the dust chute 50 to the lower stage is conveyed by the pallet 51 to the panel glass washing machine 52, and dusts or smudges are removed from the panel portion 10 by the panel glass washing machine 52. Thereafter, the washed panel portion 10 is conveyed by another pallet 53 to the panel crusher 54, and crushed under a pressure by the panel crusher 54 into recyclable glass cullets. The recyclable glass cullets are transported by the belt conveyor 55 to the panel glass cullet storage box 56, and further transported to other process, wherein they are fused for recycling. Undesirable materials are removed by the magnetic separator 57 from the glass cullets on their way to the panel glass cullet storage box 56. Thus, one cycle in the collection of used CRT is completed, and this cycle is repeated sequentially.

In the recycle-treatment process S11a, the panel portion 10 is washed and then crushed by the panel crusher 54 as described above. Unless the panel portion 10 has scratches, then such panel portion 10 may not always be crushed after having been washed, and may be recycled as it is.

As described above, according to the present invention, the waste CRT device is sequentially transported to the predetermined position by the moving pallet conveyed by the conveyor under the condition that the front face of the CRT is held. In addition, the waste CRT device can be scrapped in such a state that it is resting on the moving pallet. Therefore, a time required by a scrapping work can be reduced, and the waste CRT device can be easily inexpensively collected by the simple apparatus. Thus, natural resources can be recycled with ease.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A method of collecting a used cathode-ray tube in which a cathode-ray tube is collected from a waste cathode-ray tube device and recycled, comprising the steps of:

detachably placing a panel portion of a cathode-ray tube on a moving pallet guided and moved by a conveyor to a predetermined position and attaching said cathode-ray tube device to said moving pallet;

leaving only said cathode-ray tube by scrapping and removing said cathode-ray tube device under the condition that said cathode-ray tube is attached to said moving pallet; and separating said cathode-ray tube into a panel portion and a funnel portion and conveying said panel portion and said funnel portion to different positions at which they are recycled, respectively.

2. An apparatus for collecting a used cathode-ray tube in which a cathode-ray tube is collected from a waste cathode-ray tube device and recycled, comprising:

a conveyor having a moving pallet with means for detachably holding a panel portion of said cathode-ray tube and sequentially moving said moving pallet to a predetermined position, wherein said means for holding a panel portion and moving said moving pallet to a predetermined position is matched to a size of said cathode-ray tube, said size being determined by a size-determining means for determining the size of said cathode-ray tube;

means for scrapping said cathode-ray tube device held on said moving pallet to separate a device housing from said cathode-ray tube while leaving only said cathode-ray tube;

means for separating said cathode-ray tube into a panel portion and a funnel portion and conveying said panel portion and said funnel portion to different positions at which said panel portion and said funnel portion are recycled, respectively; and transporting means for transporting said separated device housing.

3. An apparatus for collecting a used cathode-ray tube as claimed in claim 2, wherein said holding means holds said cathode-ray tube by vacuum deposition.

4. An apparatus for collecting a used cathode-ray tube in which a cathode-ray tube is collected from a waste cathode-ray tube device and recycled, comprising:

a conveyor having a moving pallet for detachably holding a panel portion of said cathode-ray tube and sequentially moving said moving pallet to a predetermined position;

means for scrapping said cathode-ray tube device held on said moving pallet to separate a device housing from said cathode-ray tube device while leaving only said cathode-ray tube;

transporting means for transporting said separated device housing; and means for separating said cathode-ray tube into a panel portion and a funnel portion and conveying said panel portion and said funnel portion to different positions at which said panel portion and said funnel portion are recycled, respectively.

5. An apparatus as claimed in claim 4, wherein said means for separating comprises a plurality of separation stations.

6. A method of collecting a used cathode-ray tube in which a cathode-ray tube is collected from a waste cathode-ray tube device and recycled, comprising the steps of:

placing a cathode-ray tube device on a moving pallet which is guided and moved by a conveyor to a predetermined position and attaching a panel portion of said cathode ray tube device to said moving pallet;

determining a size of said cathode-ray tube device and governing a position of the attachment between said panel portion and said pallet responsive to the determined size of the cathode-ray tube device;

removing portions of said cathode-ray tube device other than said cathode-ray tube, leaving only said cathode-ray tube on said moving pallet; and separating said cathode-ray tube into a panel portion and a funnel portion and conveying said panel portion and said funnel portion to different positions at which they are recycled, respectively.

7. A method as claimed in claim 6, wherein said attaching a panel portion of said cathode ray tube device to said moving pallet comprises vacuuming chucking said panel portion to said pallet.

8. A method as claimed in claim 6, wherein said separating said cathode-ray tube is performed at any one of three separation stations.

9. A method as claimed in claim 6, further comprising removing front glass from said panel portion of said cathode ray tube before said cathode ray tube is attached to said moving pallet.

10. A method as claimed in claim 6, wherein said governing a position is performed by controlling positions of a plurality of vacuum chucks on said pallet.

11. A method as claimed in claim 6, wherein said removing portions of said cathode-ray tube device other than said cathode ray tube comprises:

providing current to an anti-explosion band attached to the panel portion of said cathode-ray tube to heat said anti-explosion band; and removing said anti-explosion band.

12. A method as claimed in claim 6, further comprising removing a shield plate from said panel portion after said panel portion has been separated from said funnel portion.

13. A method as claimed in claim 6, further comprising removing an aperture panel spring from said panel portion after said panel portion has been separated from said funnel portion.

* * * * *

UNITED STATES PATENT AND TRADEMARK OFFICE
CERTIFICATE OF CORRECTION

PATENT NO. : 5,752,868
DATED : May 19, 1998
INVENTOR(S) : Fujio Yabuki et al.

It is certified that error appears in the above-identified patent and that said Letters Patent is hereby corrected as shown below:

On Title page under heading of inventors, line 2, change "Koji" to --Kouji--.

Signed and Sealed this

Fifteenth Day of December, 1998

Attest:

Attesting Officer

BRUCE LEHMAN

Commissioner of Patents and Trademarks